(12) United States Patent
Bylander et al.

(10) Patent No.: US 8,254,739 B2
(45) Date of Patent: Aug. 28, 2012

(54) BLADELESS OPTICAL FIBER CLEAVER AND METHOD

(75) Inventors: James R. Bylander, Austin, TX (US); Donald K. Larson, Cedar Park, TX (US); Mark R. Richmond, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 386 days.

(21) Appl. No.: 12/680,961

(22) PCT Filed: Sep. 10, 2008

(86) PCT No.: PCT/US2008/075751
§ 371 (c)(1),
(2), (4) Date: Mar. 31, 2010

(87) PCT Pub. No.: WO2009/051918
PCT Pub. Date: Apr. 23, 2009

(65) Prior Publication Data
US 2010/0270350 A1    Oct. 28, 2010

(51) Int. Cl.
*G02B 6/00* (2006.01)
*B65H 35/00* (2006.01)

(52) U.S. Cl. ........................... 385/134; 225/96.5

(58) Field of Classification Search .............. None
See application file for complete search history.

(56) References Cited

U.S. PATENT DOCUMENTS

| | | | |
|---|---|---|---|
| 4,627,561 A | 12/1986 | Balyasny et al. | |
| 4,667,862 A | 5/1987 | Millar et al. | |
| 4,730,763 A * | 3/1988 | Smith | 225/96 |
| 4,790,465 A | 12/1988 | Fellows et al. | |
| 5,024,363 A | 6/1991 | Suda et al. | |
| 5,031,321 A | 7/1991 | Briscoe | |
| 5,088,637 A * | 2/1992 | Teurlings | 225/1 |
| 5,104,021 A | 4/1992 | Seike et al. | |
| 5,106,006 A | 4/1992 | Suda et al. | |
| 5,154,333 A | 10/1992 | Bauer et al. | |
| 5,297,710 A | 3/1994 | Juras | |
| 5,395,025 A * | 3/1995 | Borer et al. | 225/2 |
| 5,813,902 A * | 9/1998 | Wiegand | 451/65 |
| 5,838,850 A | 11/1998 | Mansfield et al. | |
| 5,839,635 A | 11/1998 | Mansfield | |
| 6,078,719 A * | 6/2000 | Wiegand et al. | 385/137 |
| 6,099,392 A * | 8/2000 | Wiegand et al. | 451/41 |
| 6,628,879 B2 | 9/2003 | Robinson et al. | |
| 6,634,079 B1 | 10/2003 | Kazama | |
| 6,754,426 B2 | 6/2004 | Lee et al. | |
| 6,901,199 B2 | 5/2005 | Tabeling | |

(Continued)

FOREIGN PATENT DOCUMENTS

JP    61-148407    7/1986

(Continued)

*Primary Examiner* — Omar Rojas
(74) *Attorney, Agent, or Firm* — Gregg H. Rosenblatt (57) ABSTRACT

A bladeless optical fiber cleaver is provided for cleaving an optical fiber connector in a straightforward manner. The bladeless optical fiber cleaver includes a generally planar body that includes a first body portion and a second body portion pivotably coupled to each other, where the second body portion is movable with respect to the first body portion. The fiber cleaver includes a mechanism to create a strain force in a stripped portion of the optical fiber, where the stripped portion under strain is exposed to receive contact from a flexible abrasive material, the flexible abrasive material introducing a flaw in the optical fiber where the cleave takes place.

17 Claims, 6 Drawing Sheets

U.S. PATENT DOCUMENTS

| | | |
|---|---|---|
| 7,025,239 B2 | 4/2006 | Itano et al. |
| 7,116,882 B2 | 10/2006 | Watte et al. |
| 7,391,951 B2 | 6/2008 | Hayashi et al. |
| 2006/0263028 A1 | 11/2006 | Honma |

FOREIGN PATENT DOCUMENTS

| | | |
|---|---|---|
| JP | 05-027122 A | 2/1993 |
| JP | 06-294914 | 10/1994 |
| JP | 2002-341181 | 11/2002 |
| JP | 2003-165740 | 6/2003 |

* cited by examiner

BLADELESS OPTICAL FIBER CLEAVER AND METHOD

BACKGROUND OF THE INVENTION

1. Field of the Invention

The present invention is directed to an apparatus and method for cleaving an optical fiber, in particular, an optical fiber to be terminated and polished in the field.

2. Background

In the area of optical telecommunication networks, it is often necessary to connect one optical fiber to another. Conventional connections include fusion splices, mechanical splices and plug/unplug-type connections. Oftentimes it is necessary to perform connections in a field environment. When making such connections in the field, it may be necessary to cut or cleave an optical fiber as part of the fiber preparation process.

Current portable optical fiber cleavers are expensive, precision mechanisms that typically include two main features. First, conventional cleavers have a mechanism for placing a controlled strain on the optical fiber, through tension, bending, torsion or a combination of tension, bending, and torsion. Second, conventional cleavers have a rigid blade, typically made from diamond or other hard material, for creating a flaw on the surface of the fiber. These blades can add significant cost and, in many cases, may require regular maintenance. Also, with a rigid blade, care must be taken not to damage the fiber as it is possible for the blade to impact the optical fiber with too much force. Some conventional fiber cleavers are described in U.S. Pat. Nos. 6,634,079; 6,628,879; and 4,790,465. Laser cleavers are also known and are utilized primarily in a factory or other controlled environment.

SUMMARY

According to an exemplary aspect of the present invention, a bladeless optical fiber cleaver is provided for cleaving an optical fiber in a straightforward manner. The bladeless optical fiber cleaver includes a generally planar body that includes a first body portion and a second body portion pivotably coupled to each other, wherein the second body portion is movable with respect to the first body portion. The first and second body portions each receive a portion of the optical fiber. The fiber cleaver includes a mechanism to create a strain force in a stripped portion of the optical fiber, where the stripped portion under strain is exposed to receive contact from a flexible abrasive material, the flexible abrasive material introducing a flaw in the optical fiber where the cleave takes place.

In another aspect, the device has an open position and a closed position. In the open position, the second body portion extends linearly from an end of the first body portion. The second body portion can include a second fiber channel to receive the optical fiber, where the second body portion is rotatable by about 180 degrees with respect to the first body portion. A substantial part of the second body portion is configured to slide underneath the first body portion when in the closed position.

In another aspect, the bladeless optical fiber cleaver includes an abrasive guide formed on at least one of the first and second body portions and configured to position the flexible abrasive over the strained fiber portion. The first body portion can include an arcuate surface about which the optical fiber bends, the arcuate surface having a bend radius of at least a minimum bend radius of the optical fiber. The strained portion of the fiber can be proximate to the arcuate surface and the abrasive guide when the device is in the closed position.

In another aspect, the first body portion can include a first fiber channel and an indentation to receive a thumb of a user holding the cleaver. As the cleaver is moved from an open position to a closed position, a first portion of the optical fiber is held in place between inner walls of the first fiber channel and a second portion of the optical fiber is held in place between a pressure pad formed on an edge of the first body portion and a guide wall of the second body portion.

In another aspect, the flexible abrasive material comprises one of a sand paper, a lapping film, and a string.

In another aspect, the flexible abrasive material can comprise one of an abrasive material coated metal wire and an abrasive material coated filament.

In another aspect, when in a closed position, the device has a length of about from about 3 inches to about 4 inches and a width of from about 2 inches to about 3 inches.

In yet another aspect, the device includes a movable member hingedly coupled to the first body portion at one end of the first body portion and disposed underneath an end of the second body portion so that a surface of the movable member engages the second body portion and positions the second body portion in a substantial planar orientation with the first body portion. The device further includes a spring coupled to the first and second body portions to provide a tension on the second body portion, where the second body portion is displaced from the substantially planar orientation when the movable member is disengaged from the second body portion.

In another aspect, a first clamp disposed on the first body portion can be configured to temporarily secure a first portion of the fiber on the first body portion and a second clamp disposed on the second body portion can be configured to temporarily secure a second portion of the fiber on the second body portion. The abrasive material can contact a stripped portion of the fiber disposed between the first clamp and the second clamp to introduce the flaw.

In another aspect, at least one of the first clamp and second clamp comprises a magnetic clamp. In another aspect, the spring comprises a leaf spring. In another aspect, the spring places an axial strain onto the fiber of from about 100 grams to about 300 grams.

According to another exemplary aspect of the present invention, a method of cleaving an optical fiber comprises providing an optical fiber cleaver that includes a generally planar body having a first body portion and a second body portion pivotably coupled to each other, where the second body portion is movable with respect to the first body portion, a flexible abrasive material, and a mechanism to create a strain force in a stripped portion of the optical fiber. The method includes stripping the fiber to form the stripped fiber portion. The method also includes positioning a first part of the optical fiber in the first fiber channel and extending the stripped portion of the optical fiber onto the second body portion. The method also includes placing the optical fiber under strain and applying a portion of the flexible abrasive material on the stripped fiber portion to create a flaw in the optical fiber, where the cleave occurs at the flaw.

In another aspect, the flaw is created prior to prior to placing the optical fiber under strain. In another aspect, placing the optical fiber under strain comprises placing the optical fiber under a bending strain.

In another aspect, applying a portion of the flexible abrasive material on the stripped fiber portion comprises a lateral movement of the flexible abrasive material across a surface of the stripped fiber portion.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a bladeless apparatus and method for cleaving an optical fiber in a simple and inexpensive manner that is suitable for field operations. The cleaver embodiments described herein can be utilized with field terminable connectors or fusion splicers.

For example, FIGS. 1A-1D show a first exemplary embodiment of the present invention, a fiber cleaver 100. Fiber cleaver 100 is a bladeless, portable fiber cleaving device that provides suitable strain to permit cleaving through use of an abrasive material, such as sand paper or lapping film. Fiber cleaver 100 includes a generally planar body 105 that includes first and second body portions 110 and 120. Body portions 110 and 120 can be pivotably coupled to each other. For example, a shaft 107 can be provided for rotation of body portion 120 relative to body portion 110 in the direction of arrow 104 shown in FIG. 1A. Other pivotable connections can also be utilized, as would be consistent with the present description.

Figure 1A:
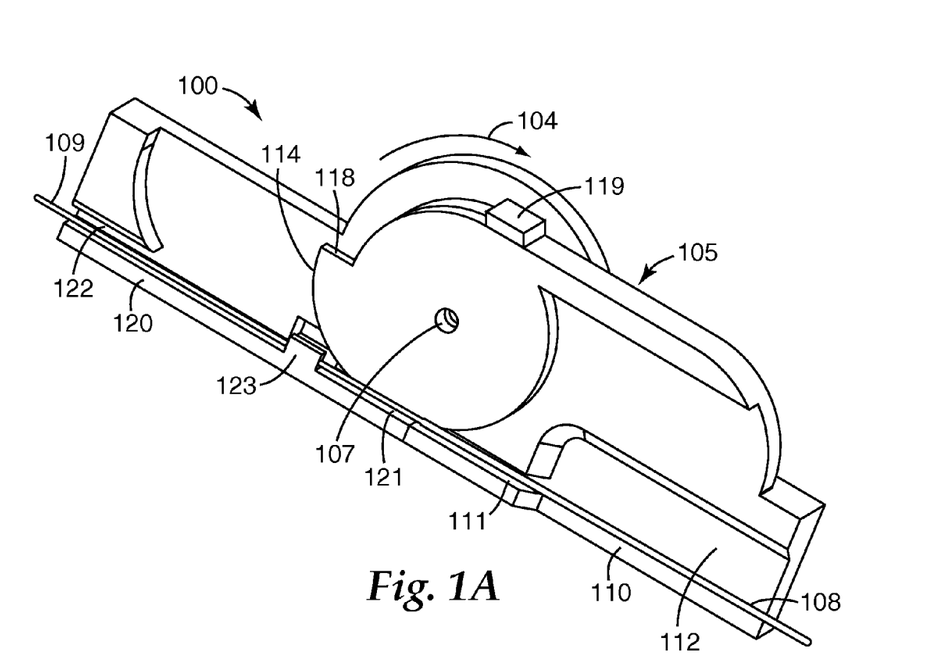
FIG. 1A is an isometric view of a fiber cleaver according to a first aspect of the invention.

In a preferred aspect, body portion 120 is configured to slide underneath body portion 110. This jack-knife type configuration provides for a compact, lightweight, inexpensive device. In FIG. 1A, device 100 is shown in an open position and in FIG. 1C, device 100 is shown in a fully closed position. In a preferred aspect, device 100, when in a closed position, can have a length of about 3 to 4 inches and a width of about 2 to 3 inches. This size may be reduced even further as would be apparent to one of skill in the art given the present description.

In a preferred aspect, body 105, including body portions 110 and 120, and components thereof can be formed or molded from a polymer material, such as a plastic, although metal and other suitably rigid materials can also be utilized.

Body portion 110 further includes an arcuate surface 114 around which an optical fiber 108 can be bent, thereby creating a bending force. The bend radius of the arcuate surface 114 is preferably about the same or greater than the minimum bend radius of the fiber to be cleaved. Fiber 108 can be loaded into device 100 by placing a portion of the fiber in guide channel 111 formed in body portion 110 and another portion of fiber 108, preferably a stripped portion 109, can be placed along guide wall 121 of body portion 120 and in second guide channel 122. Optionally, one or both of portions 110 and 120 can include additional fiber guiding elements, such as ridge 123 to further keep the fiber 108 in the proper position for cleaving. In a preferred aspect, guide channel 111 is formed near a perimeter wall of body portion 110 and has a sufficient width to receive a buffer-jacketed fiber. For example, guide channel 111 can have a width of from about 1 mm to 3 mm.

Fiber 108 can be a conventional optical fiber, such as a standard single mode or multimode optical fiber, such as SMF 28 (available from Corning Inc.).

In one aspect, device 100 can be configured such that the fiber to be cleaved can be held in place without the need for an additional mechanism. For example, a first portion of fiber 108 is disposed in channel 111 and will remain in place as the second body portion is rotated to its closed position (see FIGS. 1B and 1C), as the bending strain will cause the fiber 108 to contact both sidewalls within channel 111. A second portion of the optical fiber can also be held in place after rotation between a wall portion 121 of the second body portion 120 and an outer wall of the first body portion, or, more preferably, a stop pad 119 formed on a side wall of body portion 110.

In addition, as shown in the exemplary aspect of FIG. 1A, first body portion 110 can also include an indentation 112 that provides a surface for a user to place his or her thumb to securely hold the device 100 during cleaving. In addition, fiber 108 can be disposed on the indentation surface and can be pressed between the user's thumb or finger and the indentation surface.

Figure 1B:
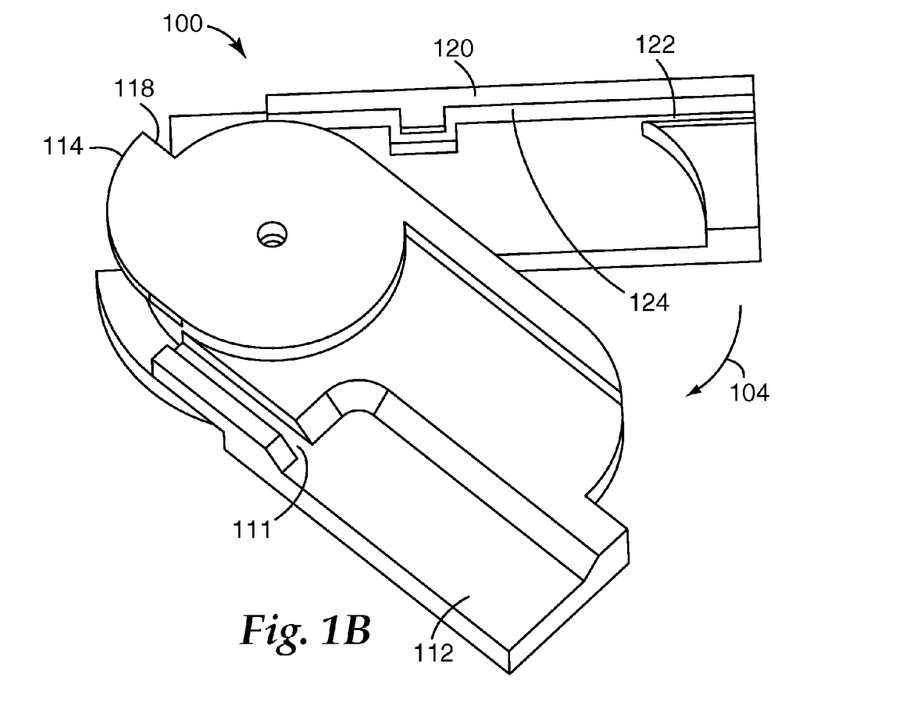
FIG. 1B is another isometric view of the fiber cleaver of FIG. 1A.
Figure 1C:
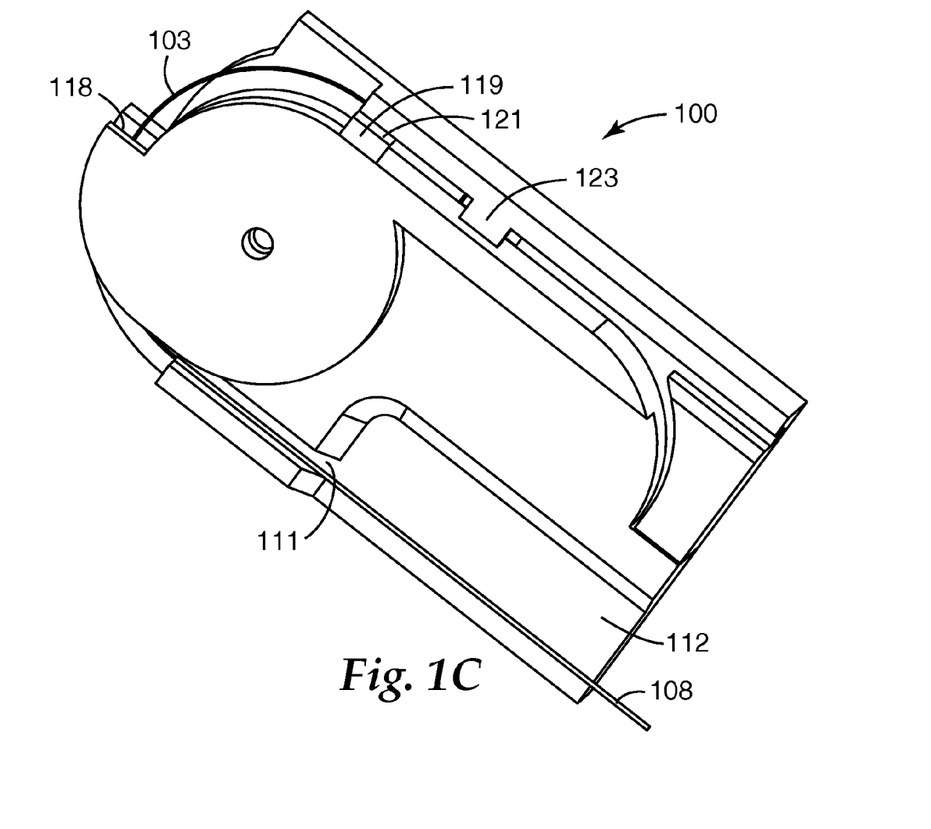
FIG. 1C is another isometric view of the fiber cleaver of FIG. 1A.
Figure 1D:
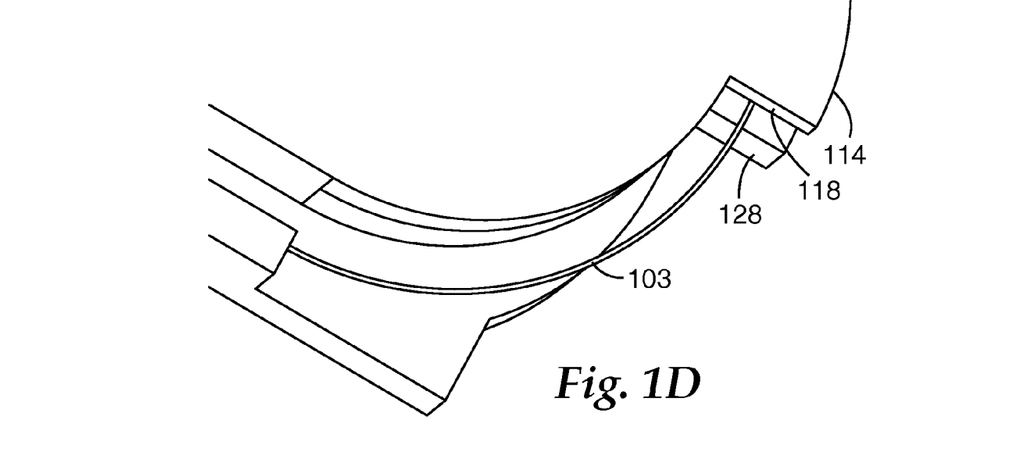
FIG. 1D is a close up view of a portion of the fiber cleaver of FIG. 1A.

As mentioned above, body portion 120 can be rotated about shaft 107 by movement in the direction of arrow 104 from an open position (see FIG. 1A) to a closed position (see FIG. 1C). FIG. 1B shows the device 100 in an intermediate position (note that fiber 108 is omitted from FIG. 1B for simplicity). During such movement, pressure can be placed on fiber 108 to hold it in place on body portion 110. In this example, body portion 110 includes indented area 112 that is configured to receive a user's thumb or finger. Fiber 108 can be held in place within channel 111.

In the closed position of FIG. 1C, device 110 provides a controlled, bending strain, as fiber 108 is held in channel 111 and by pressing action of edge or guide wall portion 121 against stop pad 119 formed on a side wall of body portion 110 (with the fiber sandwiched in between). As such, fiber 108 is bent as shown in FIG. 1C and in further close-up view in FIG. 1D, leaving an exposed bent portion 103. The user can access the bent fiber portion 103 by using one or more abrasive guides 118 and 128, formed in body portions 110 and 120, respectively. For example, the user can slide an abrasive sheet down the abrasive guide(s) until contact is made with the exposed fiber. The fiber can then be cleaved by introducing a flaw to the fiber at fiber strain region 103.

In a preferred aspect, this flaw is introduced by simply applying a flexible abrasive (not shown), preferably a flexible, coated abrasive material, to the outer surface of the stripped fiber. The flaw may be applied while the fiber is strained in a controlled manner or alternatively, the flaw may be applied before the fiber is strained. In an exemplary aspect, the abrasion action can comprise a simple lateral movement of the flexible abrasive across the stripped fiber surface. The flexible abrasive material can, for example, be a conventional sand paper sheet, or lapping film, having a grit of about 5 µm or greater. As shown in the experiment section below, a 9 µm grit paper can be utilized. A 15 µm grit paper can also be utilized. In a preferred aspect, device 100 provides a perpendicular cleave.

In an alternative aspect, the flexible abrasive material can comprise a metal wire or other filament having an abrasive material coated (either sparsely or densely) on an outer surface or portion thereof. The abrasive material can be a conventional abrasive mineral, such as diamond powders or particles, graphite/carbide powders or particles, or a similar material that is harder than glass. For example, in an exemplary alternative aspect, the flexible abrasive material can comprise a steel wire, having a diameter of about 155 µm, which is coated with 20 µm diamond particles.

In other alternative aspects, the abrasive material can comprise a sheet or ribbon of sand paper, a sheet or ribbon of lapping film, or a string form abrasive.

The abrasive can also be packaged as part of the device 100, such as by attaching it to an arm or other member, as would be apparent to one of ordinary skill in the art given the present description.

In operation, a cleaving process utilizing device 100 can take place as follows. A fiber to be cleaved is stripped using a conventional technique. The stripping can leave an exposed glass portion of the fiber of about 60 mm to about 80 mm in length. With device 100 placed in an open position, the fiber 108 can then be positioned in the guide channel 111 such that the stripped portion extended therefrom into guide channel 122. The user can place his or her thumb onto the indentation 112 of body portion 110. The body portion 120 can then be rotated about 180 degrees into a closed position, placing the stripped portion of the fiber under a controlled bending force. The user, holding the device 100 in one hand, can use the other hand to drag a portion of an abrasive film across the midpoint of the fiber arc, which is positioned at or about abrasive guide 118. With only a very modest force, a flaw is introduced onto the surface of the fiber and the strain creates a fiber break suitable for subsequent field polishing and splicing or connectorization.

An alternative embodiment, a tension-type cleaver device 200, and components thereof, are shown in FIGS. 2A-2H. Device 200 is a bladeless, portable fiber cleaving device that provides suitable tension to permit cleaving through use of an abrasive material, such as sand paper or lapping film. Fiber cleaver 200 includes a generally planar body 205 that includes first and second body portions 210 and 220. Body portions 210 and 220 can be pivotably coupled to each other. For example, a shaft 207 can be provided for movement of body portion 220 relative to body portion 210 in the direction of arrow 216 shown in FIG. 2C. In a preferred aspect, body 205 and components thereof can be formed or molded from a polymer material, such as a plastic, although metal and other suitably rigid materials can also be utilized.

Figure 2A:
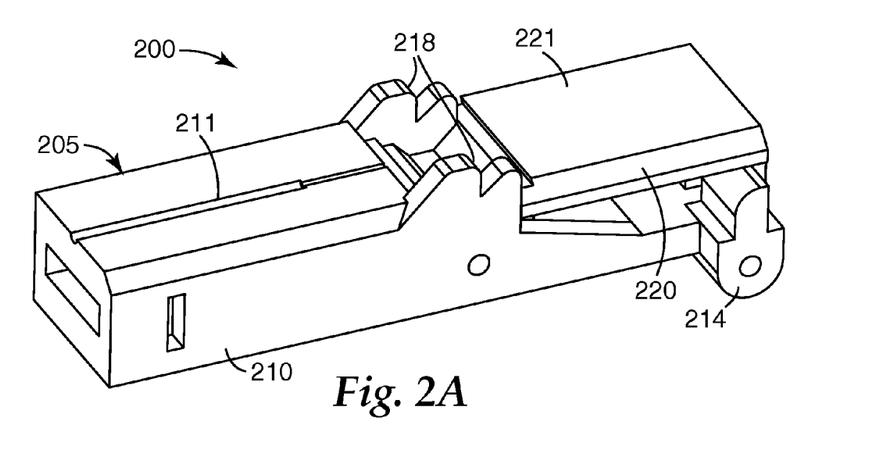
FIG. 2A is an isometric view of a fiber cleaver according to another aspect of the invention.
Figure 2B:
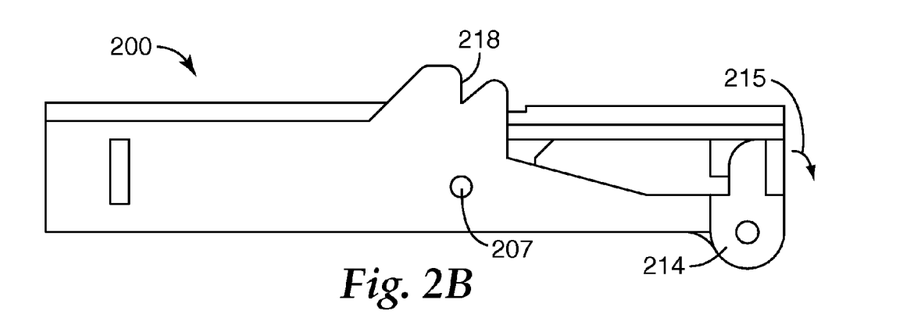
FIG. 2B is another isometric view of the fiber cleaver of FIG. 2A.
Figure 2C:
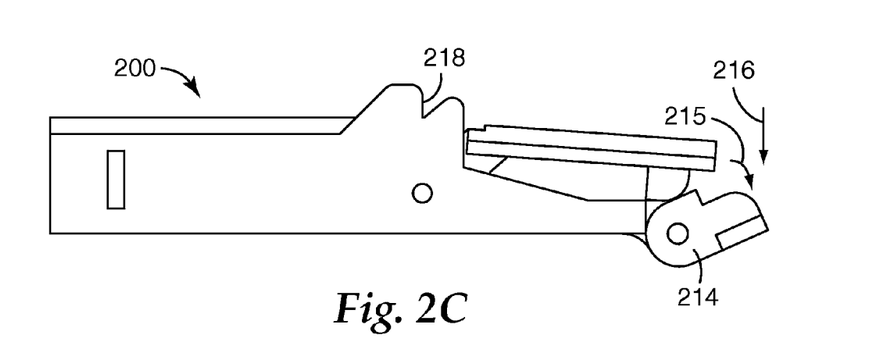
FIG. 2C is a side view of the fiber cleaver of FIG. 2A.
Figure 2D:
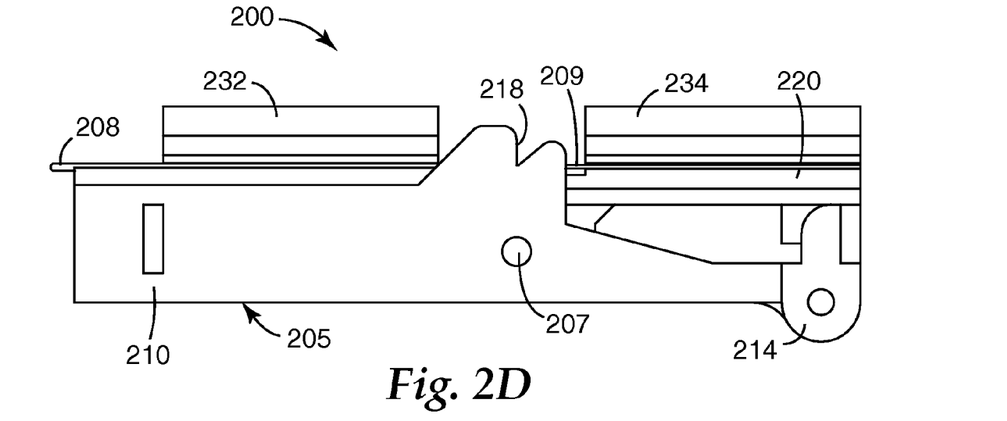
FIG. 2D is another side view of the fiber cleaver of FIG. 2A with clamps.
Figure 2E:
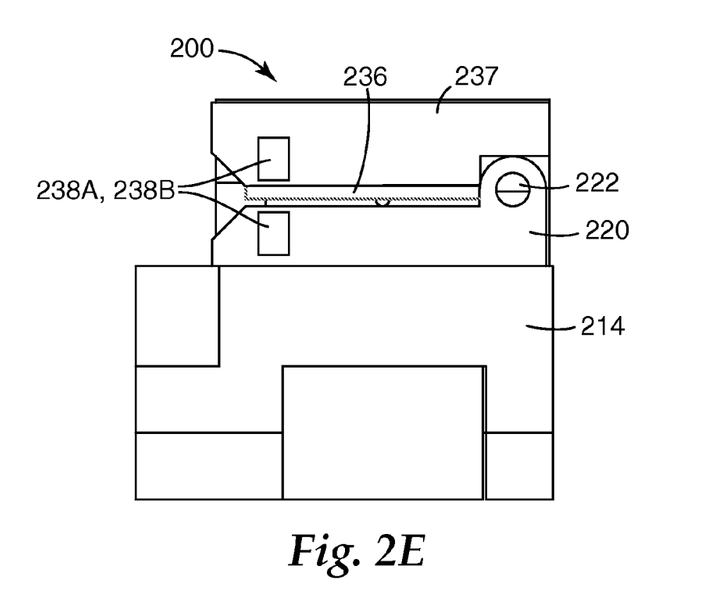
FIG. 2E is an end view of the fiber cleaver of FIG. 2D.
Figure 2F:
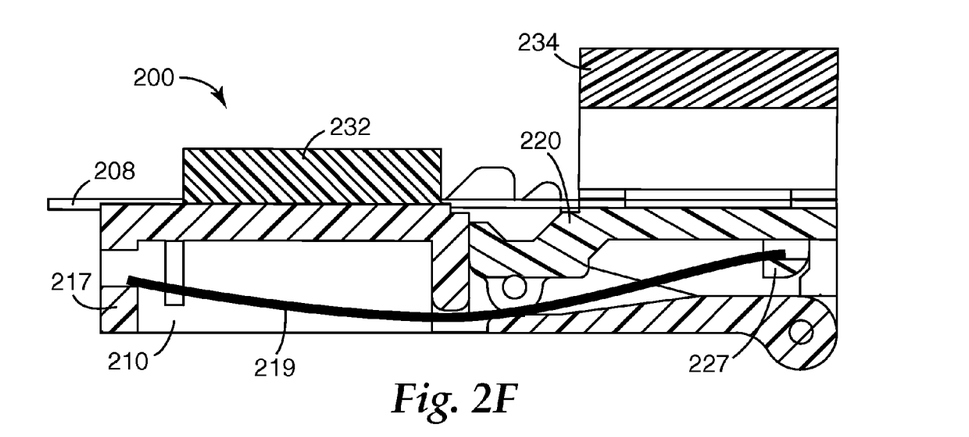
FIG. 2F is a cross section view of the fiber cleaver of FIG. 2D.
Figure 2G:
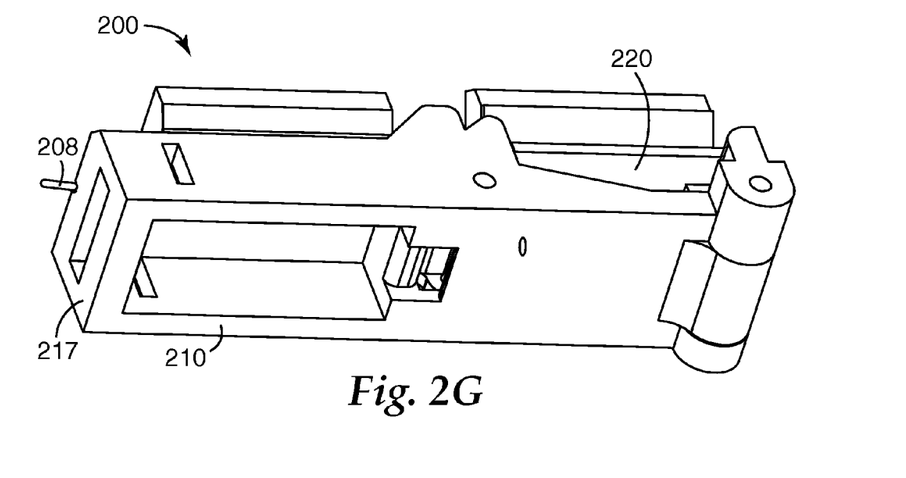
FIG. 2G is an isometric bottom view of the fiber cleaver of FIG. 2D.
Figure 2H:
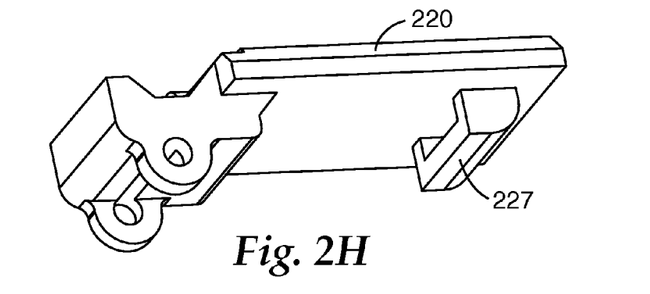
FIG. 2H is an isometric bottom view of the second body portion of the fiber cleaver of FIGS. 2A and 2D.

Body portion 210 can further include a movable member, such as stop 214, hingedly coupled to body portion 210 at one end of the body. As shown in FIG. 2A, stop 214 is positioned to engage body portion 220 to keep it in a planar orientation with body portion 220. When the stop 214 is released, e.g., by pulling the stop 214 in the direction of arrow 215 shown in FIG. 2B, the stop disengages with body portion 220. Motion of body portion 220 (e.g., downward in the direction of arrow 216 of FIG. 2C) can be accomplished substantially via internal spring tension—for example, an elastic element such as a leaf spring 219 can be coupled to body portions 210 and 220, pulling body portion 220 downward relative to body portion 210. For example, FIG. 2F shows spring 219 coupled between body portion 210 and body portion 220. In this exemplary embodiment, spring 219 can be coupled to support 217 of body portion 210 (see FIG. 2G) and to slot 227 formed on body portion 220 (see FIG. 2H). In an alternative aspect, a coil spring or other spring can be utilized. The spring tension can be used to create a tension force of about 100 grams to about 300 grams. Note that the weight of the body portion 220 (and any components formed thereon) can contribute to the tension force.

The fiber to be cleaved, here fiber 208, can be disposed on body portion 210, such as in fiber channel 211 formed on upper surface of body portion 210. The fiber 208 can extend onto the upper surface 221 of body portion 220. Although not shown, surface 221 can optionally include a fiber channel to receive a portion of fiber 208. The user can access a stripped fiber portion 203 by using one or more abrasive guides 218 formed on body portion 210. For example, the user can slide an abrasive sheet down the abrasive guide(s) until contact is made with the stripped fiber.

Device 200 can further include first and second clamp mechanisms to temporarily hold the fiber in place prior to cleaving. As shown in FIGS. 2D and 2E, the clamp mechanisms can be configured as conventional plate-type clamps 232 and 234 that can be utilized to hold fiber 208 on body portions 210 and 220. Clamps 232 and 234 can be coupled to body portions 210 and 220 via clamp hinges (see e.g., clamp hinge 222 shown in FIG. 2E).

In one aspect, as shown in FIG. 2E, clamp 234 can be formed as a magnetic clamp, where a small magnet 238A can be disposed on or within body portion 220 and another magnet 238B can be disposed on or within clamp plate 237 of clamp 234. When the clamp 234 is brought to a closed position (as is shown in FIG. 2E), fiber 208 is clamped between surface 221 and friction pad 236 formed on a surface of clamping plate 237. The magnetic forces of the magnets 238A and 238B can thus keep clamp 234 in a closed position, and can provide enough force to prevent axial movement of fiber 208. In an alternative aspect, clamp 234 may be formed using a conventional clasp or fastener. Although not shown, clamp 232 can be configured in a similar manner to clamp 234.

Cleaving of fiber 208 occurs when a flaw is introduced onto a stripped portion 209 of the fiber and the fiber experiences tension. Similar to the process described above with respect to device 100, a flaw is introduced by simply applying an abrasive (not shown), preferably a flexible, coated abrasive material, to the outer surface of the stripped fiber. The flaw may be applied while the fiber is strained in a controlled manner or alternatively, the flaw may be applied before the fiber is strained. The flexible abrasive material can, for example, be a conventional sand paper, or lapping film, or other material, such as is described above. In a preferred aspect, device 200 provides a perpendicular cleave. In an exemplary aspect, the abrasion action can comprise a simple lateral movement of the flexible abrasive across the stripped fiber surface.

In operation, a cleaving process utilizing device 200 can take place as follows. A fiber to be cleaved is stripped using a conventional technique. The stripping can leave an exposed glass portion of the fiber of about 60 mm to about 80 mm in length. The coated portion of the fiber can be disposed on body portion 210, while the stripped fiber portion can be disposed on second body portion 220. The fiber can then be secured in position across both the first and second body portions by actuating clamps 232 and 234, while the stop 214 is engaged with body portion 220. The stop 214 can then be released in the direction of arrow 215 so that it is disengaged from body portion 220. With the clamped fiber bearing the tension of the second body portion, the user can hold the device 200 in one hand and can use the other hand to drag a portion of an abrasive film across the unclamped portion of the fiber (see e.g., fiber portion 209 in FIG. 2D). The user can access the stripped fiber portion by using one or more abrasive guides 218. With only a very modest force, a flaw is introduced onto the surface of the fiber and the tension creates a fiber break suitable for subsequent field polishing and splicing or connectorization.

In addition to the embodiments described above, further alternative aspects include providing bladeless devices with an additional strain inducing mechanism, such as a tortional strain mechanism, that would allow the user to create a non-perpendicular angle cleave. In another alternative, a portion to the fiber can be held ion a ferrule of a fiber connector mounted to the cleaver device. In this alternative, a second portion of the fiber can be positioned external to the connector body and held with a controlled tensile strain as the flexible abrasive is moved tangentially across the surface of the fiber and substantially perpendicular to the fiber axis.

EXPERIMENT

Figure 3A:
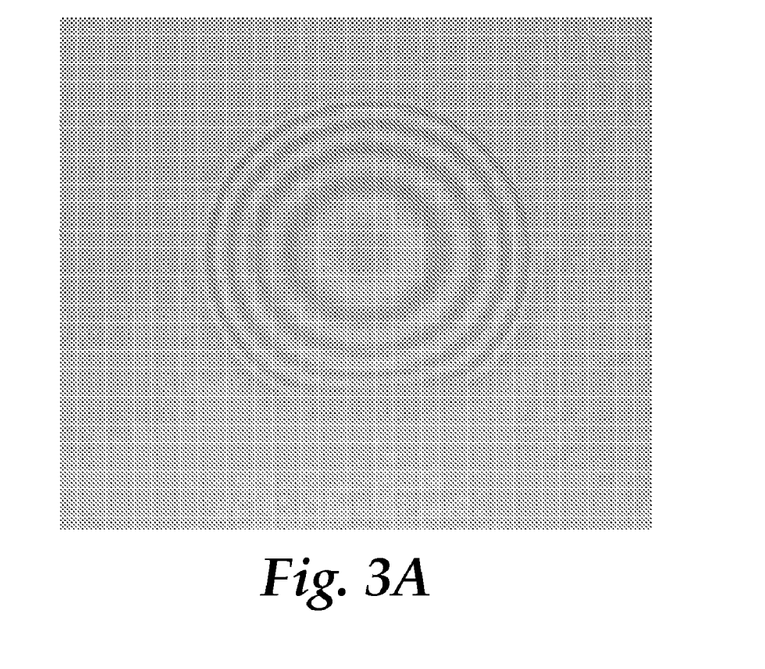
FIG. 3A is an image of an exemplary fiber end cleaved using the fiber cleaver of an aspect of the present invention.

In a first experiment, a device configured in a manner similar to device 100 was utilized. The device held a standard 125 μm telecommunications fiber at a 30 mm bend. A 15 μm silicon carbide lapping film (commercially available from 3M Company, St. Paul, Minn.) was slid across a stripped portion of the fiber near the apex of the fiber bend. This process was completed for several fibers. The cleaved fibers were then inserted into a sample mechanical fiber connector (an NPC type connector, available from 3M Company, St. Paul, Minn.) and clamped in place to provide a 30 μm fiber tip protrusion. A one step polish was performed on the cleaved fiber to dome the fiber end (10 figure-8 motions were applied on a wet lapping film). The resulting fiber end had a sufficiently centered apex. A photo image of the interferogram for one of the prepared fibers is shown in FIG. 3A. The resulting end shape and finish is adequate for use in a field installed connector.

Figure 3B:
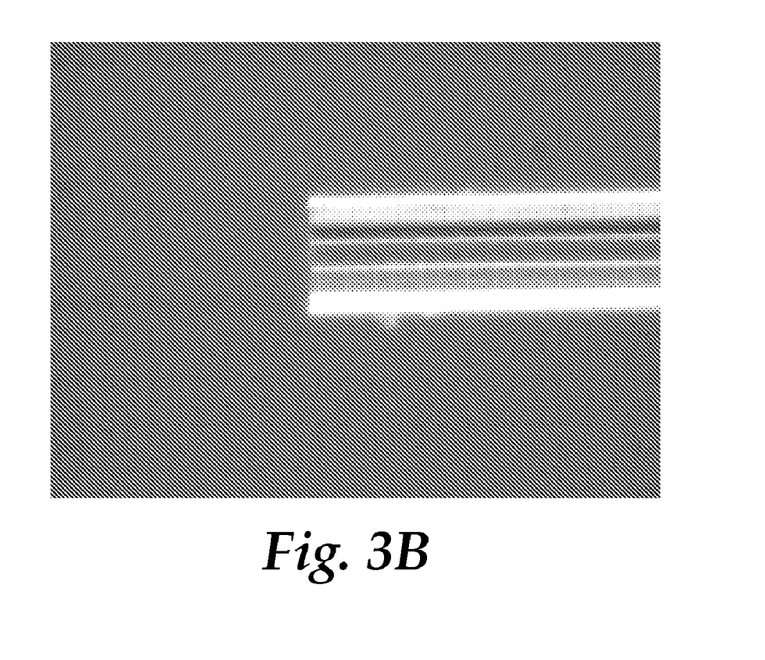
FIG. 3B is a side view image of an exemplary fiber end cleaved using the fiber cleaver of another aspect of the present invention.

In another experiment, a device configured in a manner similar to device 200 was utilized. The device held a 125 μm telecommunications fiber under a tension of about 200 grams. A 15 μm silicon carbide lapping film (commercially available from 3M Company, St. Paul, Minn.) was slid across a stripped portion of the fiber introducing a flaw that initiated a fiber cleave. An image of an exemplary cleaved fiber from this experiment is shown in FIG. 3B.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A bladeless optical fiber cleaver to cleave an optical fiber, comprising:
    a generally planar body that includes a first body portion and a second body portion pivotably coupled to each other, wherein the second body portion is movable with respect to the first body portion, and wherein each of the first and second body portions receive a portion of the optical fiber;
    a flexible abrasive material; and
    a mechanism to create a strain force in a stripped portion of the optical fiber;
    wherein the stripped portion under strain is exposed to receive contact from the abrasive material, the abrasive material introducing a flaw in the optical fiber where the cleave occurs.

2. The bladeless optical fiber cleaver of claim 1, wherein the device has an open position and a closed position, wherein, in the open position, the second body portion extends linearly from an end of the first body portion, wherein the second body portion includes a second fiber channel to receive the optical fiber, wherein the second body portion is rotatable by about 180 degrees with respect to the first body portion, wherein a substantial part of the second body portion is configured to slide underneath the first body portion when in the closed position.

3. The bladeless optical fiber cleaver of claim 2, further comprising an abrasive guide formed on at least one of the first and second body portions, the abrasive guide configured to position the flexible abrasive over the strained fiber portion; wherein the first body portion includes an arcuate surface about which the optical fiber bends, the arcuate surface having a bend radius of at least a minimum bend radius of the optical fiber, wherein the strained portion of the fiber is proximate to the arcuate surface and the abrasive guide when the device is in the closed position.

4. The bladeless optical fiber cleaver of claim 3, wherein the first body portion includes a first fiber channel formed thereon to receive the optical fiber and an indentation to receive a thumb of a user holding the cleaver, wherein a first portion of the optical fiber is held in place between inner walls of the first fiber channel, and wherein a second portion of the optical fiber is held in place between a pressure pad formed on an edge of the first body portion and a guide wall of the second body portion.

5. The bladeless optical fiber cleaver of claim 1, wherein the flexible abrasive material comprises one of a sand paper, a lapping film, and a string.

6. The bladeless optical fiber cleaver of claim 1, wherein the flexible abrasive material comprises one of an abrasive material coated metal wire and an abrasive material coated filament.

7. The bladeless optical fiber cleaver of claim 2, wherein, when in a closed position, the device has a length of about from about 3 inches to about 4 inches and a width of from about 2 inches to about 3 inches.

8. The bladeless optical fiber cleaver of claim 1, further comprising:
a movable member hingedly coupled to the first body portion at one end of the first body portion and disposed underneath an end of the second body portion so that a surface of the movable member engages the second body portion and positions the second body portion in a substantial planar orientation with the first body portion; and
a spring coupled to the first and second body portions to provide a tension on the second body portion, wherein the second body portion is displaced from the substantially planar orientation when the movable member is disengaged from the second body portion.

9. The bladeless optical fiber cleaver of claim 8, further comprising:
a first clamp disposed on the first body portion configured to temporarily secure a first portion of the fiber on the first body portion; and
a second clamp disposed on the second body portion configured to temporarily secure a second portion of the fiber on the second body portion.

10. The bladeless optical fiber cleaver of claim 9, wherein the abrasive material contacts a stripped portion of the fiber disposed between the first clamp and the second clamp to introduce the flaw.

11. The bladeless optical fiber cleaver of claim 9, wherein at least one of the first clamp and second clamp comprises a magnetic clamp.

12. The bladeless optical fiber cleaver of claim 8, wherein the spring comprises a leaf spring.

13. The bladeless optical fiber cleaver of claim 8, wherein the spring places an axial strain onto the fiber of from about 100 grams to about 300 grams.

14. A method of cleaving an optical fiber, comprising:
providing a bladeless optical fiber cleaver that includes a generally planar body having a first body portion and a second body portion pivotably coupled to each other, wherein the second body portion is movable with respect to the first body portion, a flexible abrasive material, and a mechanism to create a strain force in a stripped portion of the optical fiber;
stripping the fiber to form the stripped fiber portion;
positioning a first part of the optical fiber onto the first body portion and extending the stripped portion of the optical fiber onto the second body portion;
placing the optical fiber under strain; and
applying a portion of the flexible abrasive material on the stripped fiber portion to create a flaw in the optical fiber, wherein the cleave occurs at the flaw.

15. The method of claim 14, wherein the flaw is created prior to prior to placing the optical fiber under strain.

16. The method of claim 14, wherein placing the optical fiber under strain comprises placing the optical fiber under a tensile strain.

17. The method of claim 14, wherein applying a portion of the flexible abrasive material on the stripped fiber portion comprises a lateral movement of the flexible abrasive material across a surface of the stripped fiber portion.

* * * * *

UNITED STATES PATENT AND TRADEMARK OFFICE
CERTIFICATE OF CORRECTION

PATENT NO. : 8,254,739 B2
APPLICATION NO. : 12/680961
DATED : August 28, 2012
INVENTOR(S) : James R Bylander It is certified that error appears in the above-identified patent and that said Letters Patent is hereby corrected as shown below:

Column 7,
Line 50, delete "tortional" and insert --torsional-- therefor.

Column 10,
Line 30, delete the first occurrence of "prior to".

Signed and Sealed this
First Day of January, 2013

David J. Kappos
*Director of the United States Patent and Trademark Office*